United States Patent

[11] 3,590,527

| [72] | Inventor | Johannes P. Pijst<br>Hillegom, Netherlands |
|---|---|---|
| [21] | Appl. No. | 738,845 |
| [22] | Filed | June 21, 1968 |
| [45] | Patented | July 6, 1971 |
| [73] | Assignee | N. V. Hollandsche Draad-en Kabelfabriek<br>Amsterdam, Netherlands |

[54] SHEET OF PLASTIC MATERIAL FOR PROTECTION OF VEGETATIVE PLANTS
4 Claims, No Drawings

[52] U.S. Cl. .................................................... 47/9, 47/2
[51] Int. Cl. ....................................... A01g 13/02
[50] Field of Search ................................. 47/1, 9, 26, 29, 58, 2, 34, 56

[56] References Cited
UNITED STATES PATENTS

| 2,875,555 | 3/1959 | Thiegs et al. ................. | 47/2 |
| 2,945,322 | 7/1960 | Gaeth et al. .................. | 47/9 |
| 2,988,441 | 6/1961 | Pruitt ........................... | 47/34 UX |
| 3,299,566 | 1/1967 | MacMullen ................... | 47/1 |
| 3,299,568 | 1/1967 | Tobolsky et al. ............. | 47/9 |
| 3,320,695 | 5/1967 | Moore .......................... | 47/9 |

*Primary Examiner*—Robert E. Bagwill
*Attorney*—Waters, Roditi, Schwartz & Nissen ABSTRACT: A sheet of plastic material for protecting a vegetative plant, the material being air and water permeable and sensitive to light so as to be gradually disintegrated thereby.

SHEET OF PLASTIC MATERIAL FOR PROTECTION OF VEGETATIVE PLANTS

DETAILED DESCRIPTION OF THE INVENTION

The invention relates to the protection of growing plants, and particularly to sheets of plastic material for protecting growing seeds, bulbs or tubers.

When cultivating nonwinter resistant plants, it is often necessary to cover the culture soil, after seeds, bulbs and tubers have been sown therein, with a protective layer, such as a layer of reeds. However, when using reeds, the reed cover is loosened and a part thereof is removed in the spring in order to enable the growing plants to harden off. Several weeks later the remaining reed layer is removed. Such a procedure is time-consuming and requires much labor.

An object of the invention is to provide a layer of protective material which avoids the above difficulties.

According to the invention, a sheet of plastic is employed to protect a vegetative plant, the material being air- and water-permeable and of such composition and thickness that when spread over the plant, it is gradually disintegrated under the influence of sunlight, so as to allow the growing crops to break through said sheet without damage to the plant.

It is a feature of the invention that the plastic material is subject to the same conditions of sunlight as the plant, since it covers the same, and therefore the rate of deterioration of the plastic material will be related to the growth of the plant.

The sheet of plastic material according to the invention preferably consists of a sheet of foamed plastic material containing open cells. The plastic material may be an adduct of a multifunctional isocyanate with a multifunctional alcohol of a polyether. More particularly, the adduct may be of toluene di-isocyanate with di-, tri- or higher functional alcohols of a polyether.

By the application of a protective sheet of plastic material according to the invention, a great saving of labor is obtained in that after the application of the sheet no further work need be done. The very small weight of the covering sheets according to the invention is also a labor-saving factor. At the same time, a great saving of material is obtained, in that a covering layer according to the invention, having a thickness of, for example, 6 mm., offers a protection comparable to a reed layer having a thickness of from 15 to 20 cm. A great advantage of a covering layer according to the invention is that the same influences which determine the earlier or later growth of the crops, also determine the disintegration of the sheet material of the covering layer.

Covering sheets according to the invention can be supplied on rolls in quantities of several hundreds of square meters, in which form they are particularly suitable for application by mechanical means.

Sheet plastic materials suitable as covering layers are the plastic foams prepared in accordance with the following Examples.

EXAMPLE I

A flexible polyetherfoam is prepared by uniformly and continuously mixing together 100 parts by weight of a triol of a copolymer of ethylene oxide and propylene oxide, 46 parts by weight of a mixture of about 80 percent 2,4-toluene di-isocyanate and 20 percent 2,6 -toluene di-isocyanate, 3.4 parts of water, 0.14 parts of ethylene diamine, 0.19 parts of stannous octoate and 1.36 parts of silicon oil.

The mixture, prepared as described above, is poured in a moving trough as described in U.S. Pat. No. 3,091,811 where it rises to form a continuous slab of cellular material, with a density of 28 kg./m³. The slab is sliced in sheets of a thickness of about 6 mm.

EXAMPLE II

A flexible polyfoam is prepared by uniformly and continuously mixing together 100 parts by weight of a triol of polypropylene oxide, 60 part by weight of a mixture of about 80 percent 2,4-toluene di-isocyanate and 20 percent 2,6-toluene di-isocyanate, 4.8 parts of water, 0.15 parts of ethylene diamine, 0.36 parts of stannous octoate, 1.75 parts of silicon oil, and 2.0 parts of monofluorotrichloromethane.

The mixture prepared as described above was formed into a continuous slab in the manner as described in Example I, and the slab was sliced in sheets of a thickness of about 6 mm. The material had a density of 19 kg./m³.

EXAMPLE III

A flexible polyfoam is prepared by uniformly and continuously mixing together 100 parts by weight of a triol of polypropylene oxide, 60 parts of about 80 percent 2,4-toluene di-isocyanate and 20 percent 2,6-toluene di-isocyanate, 4.8 parts of water, 0.15 parts of ethylene diamine, 0.50 parts of stannous octoate, 2.65 parts of silicon oil and 18 parts of monofluorotrichloromethane.

The mixture was formed into a continuous slab, as described hereinabove in Example 1, and the density of the material was 15 kg./m³. The slab was sliced in sheets of a thickness of about 6 mm.

In a field test, sheets of materials produced by Examples I—III, each 6 mm. thick, were spread over vegetating bulbs. the effect of the sunlight on these samples and the atmospheric influences were evaluated by determining the loss of weight of the covering layer.

IN Table 1 the loss of weight is indicated in percent of the initial weight as a function of growing time, which is indicated in weeks. Sample IV, which is a reference sample of a plastic material not according to the invention, consisted of similar sheets of a plastic foam of an adduct of toluene d-isocyanate with a triol of polyester having a density of 26 kg./m³.

TABLE I

| Sample: | Weeks | | | | | | | | | |
|---|---|---|---|---|---|---|---|---|---|---|
| | 4 | 6 | 8 | 10 | 12 | 14 | 17 | 19 | 22 | 25 |
| I | 10 | 27 | 44 | 44 | 44 | 53 | 84 | 92 | 100 | |
| II | 23 | 39 | 57 | 66 | 75 | 84 | 100 | | | |
| III | 42 | 65 | 92 | 94 | 100 | | | | | |
| IV | 3 | 3 | 3 | 3 | 3 | 15 | 20 | 25 | 25 | 28 |

Bulbs during spring growth grew through a covering layer manufactured of the foam products (Samples I—III) indicated in Table I, the said material having completely disappeared at the time for lifting the bulbs. It will be seen from Table I that Sample IV was not suitable for making covering layers according to the invention.

In selecting sheet material for use as a covering layer, it is preferred that when the material is applied at the end of October or the beginning of November the sheet thickness will decrease at the end of January to 60—80 percent of the initial value, and during the month of March it will decrease to 30—45 percent of the initial value.

Obviously, the rate at which the sheet material deteriorates will be selected on the amount of sunlight and temperature in the particular climate in which it is used, as well as on the particular species of vegetation to be protected. The range of density may vary between 10 and 30 kg./m³ and the sheet thickness is preferred to be between 3 and 7 mm. Generally, for lower temperatures and increased amount of sun, sheet material having lower density and greater thickness will be employed.

What I claim is:
1. A method for protecting growing seeds, bulbs or tubers against frost injury, said method comprising forming a sheet of flexible foam material containing open cells and constituted as an adduct of a polyol of polyalkylene oxide and an amount of 100 parts and toluene di-isocyanate in an amount of 40—60 parts, said sheet being formed with a thickness of between 3 and 7 mm. and a density in the range of between 10 and 30 kg./m$^3$, covering soil containing a planted row of seeds, bulbs or tubers with said sheet of plastic material which is both air and water permeable, said sheet being spread over the soil to furnish protection therefor and the vegetative plant produced by the seeds, bulbs, or tubers while enabling the plant to grow therebeneath, said sheet being light sensitive such that it undergoes gradual disintegration in correlation with plant growth thereby to enable the vegetating plant eventually to break through the disintegrating sheet without damage to the plant.

2. A method as claimed in claim 1 wherein said sheet is in slab form.

3. A method as claimed in claim 1 wherein said sheet is first wound in a roll and then unwound for application on the soil.

4. A method as claimed in claim 1 wherein said sheet is about 6 mm. thick.